United States Patent Office 3,136,682
Patented June 9, 1964

3,136,682
MANUFACTURE OF LEATHER-LIKE OPEN FIBROUS MATERIALS
Shu-Tung Tu, Ipswich, Mass., assignor to United Shoe Machinery Corporation, Flemington, N.J., a corporation of New Jersey
No Drawing. Filed Sept. 25, 1961, Ser. No. 140,251
4 Claims. (Cl. 162—151)

This invention relates to the manufacture of leather-like open fibrous materials.

Leather-like materials have been made from collagen fibers from skins or hides held in stable intertwined relation by proteinous material, for example collagen or gelatin precipitated from aqueous solution in the fiber mass. These materials can be made to possess the desirable properties of leather, such as moisture absorption, strength, flexibility, softness and so on to a considerable degree. The strength developed depends to some extent on so-called "water-bonding"; but unless special precautions are taken, this water-bonding holds the fibers together so tightly as to give a hard, unpleasant feeling product. This is particularly the case with compositions where the proteinous material in solution is gelatin which appears to enter more intimately into association with the fibers. Development of excessive water-bonding has been avoided by use of water miscible solvents to remove water from the compositions.

Controlled removal of water from the set material, for example by extraction with a water miscible organic solvent, as shown in the United States patents to Highberger and Whitmore, Nos. 2,934,446 and 2,934,447, issued April 26, 1960, and entitled "Collagen Fiber Masses and Methods of Making the Same," and the application of Tu (the present inventor) and Whitmore, Serial No. 98,318, filed March 27,1961, and entitled "Process of Making Leather-Like Material," involves penetration of the solvent and water dissolved therein from the material. This process is somewhat slow and expensive in view of the necessity in large scale operations of removing the water from the solvent for re-use of the solvent. Also control of the extent of extraction is important in order that sufficent water may be left to improve the bonding together of the fibers by the water bonding effect. An alternative procedure of removing water is the step of so-called freeze-drying in which the mixture of fibers and proteinous solution is frozen and the water removed by sublimation. This procedure is expensive and slow.

It is an object of the present invention to provide a safer, less expensive process for making an improved, strong leather-like material from compositions including collagen fibers and an aqueous binder such as a solution of skin proteinous material.

To this end, and in accordance with a feature of the present invention, compositions comprising collagen fiber and an aqueous solution or dispersion of a binder, suitably an aqueous solution of a skin proteinous material, precipitable by a chrome tanning agent are subjected to physical treatment which effects a separation of water into separate phases usually with a limited redisposition and precipitation of the binder material on the fibers in the mass of composition and with the water in a condition more readily separable from the mass. Water is removed from the mass and the product is a strong open-fibered sheet.

The term "open-fibered" is used herein to designate a structure in which the fibers are not plastered together or cemented into a horny or parchment-like translucent mass, but are bonded only at spaced points throughout their lengths and retain their individuality to a considerable extent as do the fibers in leather.

The term "aqueous solution of skin proteinous material precipitable by a chrome tanning agent" is intended to cover solutions of soluble collagen, e.g., tropocollagen and of gelatins resulting from the limited breaking up of the collagen molecule. Use of the term to define the material is not intended to imply that a chrome tanning agent is required in the process.

The initial stage in the convérsion of a mixture of collagen fibers and gelatin or collagen solution to a leather-like material involves gelling of the solution to set the mixture to shape retaining condition. Gelling of such a solution involves a phenomenon similar to crystallization in a lattice work of fibers or needles. In this lattice work a portion of the water content of the solution is held more or less in the form of free water within the lattice work. Where a cross-linking agent, such as a chromium tanning agent, is present, its action is to insolubilize the gelatin or collagen and to link the needles or fibers together by chemical bonds.

In a preferred form of the process of the present application, a mixture of collagen fibers and gelatin or collagen solution is formed and caused to gel following procedure described in the above referred to patents and patent application. After the solution has set, the mixture is cooled to develop ice crystals from the water held in the gel, the cooling being carried out at a rate which allows the growth of relatively large ice crystals. The ice crystals cause a limited rupturing of the gel structure work and the mixture is then warmed to melt the ice crystals. The water is no longer trapped since the gel structure is disrupted, and a substantial portion of this water can be removed in liquid form, some of it by simple syneresis or bleeding, and additional amounts by pressing of the mixture. It appears also that in addition to rupturing the gel structure, the freezing of the water content effects a limited redisposition of the binder to more desirable relations in respect to the fibers and to the sheet as a whole. Thus, it appears that there has been an increase in the amount of the binder at the surface of the sheet giving a structure comparable to the grain layer in ordinary leather.

The collagen fiber material constituting one of the elements of the new leather-like sheet is prepared by teasing animal skin into individual fibers or into bundles of fibers. A suitable procedure for separating the skin into fibers is shown in United States Letters Patent 3,063,892 entitled "Preparation of Hide Fiber" in the names of Frederic C. Merriam and Robert A. Whitmore, which issued November 13, 1962, on an application Serial No. 846,254, filed October 14, 1959.

The gelatin which may be used as a binder component of the material may be derived from any of the conventional sources of collagen, such as skin, bone, hoofs, etc., by processes known per se in which the collagen is partially degraded or hydrolyzed to bring it to a condition in which its molecular size is smaller and its solubility in water increased. Because of their ready availability, the commercial-type gelatins will normally be used, and either the type A gelatin, which is derived from acidified hide materials, or the type B gelatin, which is derived from alkali treated source material, may be used.

Acid-extractable soluble collagen, e.g., "tropocollagen," from such materials as calfskin is another useful proteinous binder useful in the present invention. This material may be extracted for example by procedures disclosed in the Highberger et al. patent noted above by soaking comminuted skin material in an aqueous acid solution at pH 2 to 4.5 for a period of several hours.

Combination of the existing collagen fibers with the gelatin or collagen solution is effected by bringing the fibers and solution together under such conditions as to insure uniform distribution of the solution through the mass of existing fibers. It is preferred to use solutions having high solids concentrations within the limits imposed by viscosity considerations. That is, the concentration must not be so high as to increase the viscosity to interfere with mixing and penetration of the solution into the mass of fibers. Aqueous solutions containing from about 0.5% to about 25% gelatin, preferably 0.5% to 10%, have been used. Moderately elevated temperatures from about 25° C. to about 50° C. reduce the viscosity of such solutions and facilitate mixing and impregnation.

One method for combining the collagen fibers and the solution of gelatin or collagen for the manufacture of a skin-like or leather-like material involves forming a sheet or mat of the fibers and impregnating it with the solution. A preferred procedure involves the formation of a free-flowing aqueous slurry of collagen fibers and depositing the slurry on a porous or foraminous surface and withdrawing water through the surface to form a wet layer of intermeshed or matted collagen fibers. Fluid slurries for formation of a sheet by this procedure may have a fiber solids content up to about 6% by weight based on the weight of the slurry, but about 2% by weight is preferred.

Many different types of apparatus are available for use in forming a sheet from the fibrous slurry. The apparatus may vary from a simple screen or perforated plate to equipment for continuous sheet formation in which pressure or vacuum may be used to increase the rate of removal of liquid from the slurry. Water is usually removed from the fibers to give a water content of 80% to 85% by weight based on the total weight of the fibers and water.

The binder liquid may be supplied to the fiber layer left after expression of the water. After introduction of the liquid and spreading, or allowing time for the liquid to flow over the entire surface of the layer of fibers deposited there, air pressure may be applied to force the liquid into the fibrous layer. The liquid operates to drive before it and displace residual water within the fibrous layer. A variety of treating agents in liquid form may be applied successively to the deposited fibrous layer. Thus, after the binder liquid such as gelatin or collagen solution is impregnated into a deposited fibrous layer, a tanning agent solution, a resin latex, a liquid plasticizing agent and so on may be forced into the fibrous layer.

Another method for accomplishing association of the fibers and gelatin or collagen solution involves the introduction of the fiber into a suitable mixer, which may be worm-type mixer, in which the components are worked and squeezed to distribute the solution uniformly through the fiber mass. The mixture will then be formed into a sheet by suitable procedures known per se involving rolling, extrusion, pressing or the like. The formed sheet will set on gelling of the solutions.

Mixtures suitable for conversion to sheet form by this method may have a solids content (combined fiber and gelatin or soluble collagen solids) in the range of from about 5% to about 25% by weight, preferably about 12% based on the weight of the mix. The gelatin or soluble collagen may be present to the extent of about 2% to about 20% by weight, preferably about 10% to 12% based on the combined weight of fibers and collagen or collagen derivative.

Compounds effective in aqueous solution to precipitate gelatin or collagen from solution include the water soluble compounds of trivalent and hexavalent chrominum. My copending application, Serial No. 26,399, entitled "Manufacture of Collagent Products," filed May 3, 1960, describes solutions which have been found useful in the present relation and sets forth in detail pH conditions, masking agents, concentrations and proportions of solutions useful in the present relationship. As described in that application, the compounds formed by partially neutralizing chromic salts such as chromic chloride and chromic sulfate give very desirable results. The reaction of these chromic salts with alkaline material brings the salt first to the stage referred to by tanners as "one third basic" and then to higher basicity up to as high as about 50% basic with an optimum of 40% for the present purpose. Use of the basic chromium solution not only precipitates gelatin or collagen from solution but also tans and bonds the precipitated gelatin or collagen and existing collagen fibers to give a desirable relatively high "shrink temperature."

Combination of gelatin or collagen with the chrome tanning agent occurs in the pH range of about 3 to 5.5 depending on the amount of masking agent. The pH of the chrome solution and/or the material containing dissolved gelatin or collagen are adjusted so that when the solution and material are brought together, the resulting pH is in this range.

A masking or complexing agent such as the ammonium and alkali metal salts of formic acid and of hydroxy carboxylic acids, e.g., sodium tartrate, sodium gluconate, and sodium phthalate, may be used with the chromic salts, these agents being capable of forming complex molecules with the products formed by partial neutralization of the salts. The complex compounds thus formed are relatively stable so that the pH of the solution may be raised to as high as about 5 without precipitation of chromic oxide. For use in the process of the present invention, the solution is ordinarily adjusted by addition of an alkaline material such as sodium hydroxide to a pH of from about 3 to about 5, preferably about 4. It is to be noted that with the complex solution, the pH of the solution may require as much as two days to stabilize, during which time additional alkaline material may be added to achieve the desired final pH value.

Many alternatives are available in the procedures for effecting this precipitation. A sheet formed from mixed collagen fibers and gelatin or collagen which has been set into shape-retaining condition may be immersed in or otherwise contacted with an aqueous solution of the tanning agent in concentration and for a time sufficient to precipitate the gelatin or collagen and to form chemical bonds between the precipitated gelatin or collagen and the collagen fibers. It has been found that a treatment sufficient to give a combined chromium content of 0.2% by weight calculated as $CR_2O_3$, based on the weight of the fibers and gelatin or collagen will precipitate the gelatin or collagen and effect chemical bonding. Usually this treatment is carried out in a manner giving a higher chrome content such as 1 to 4%, preferably about 2%, to effect a full tanning of the sheet.

Another precipitation procedure involves the tanning, preferably chrome tanning, of the collagen fibers, before association with the gelatin or collagen solutions. The percentage of combined tanning agent to achieve this may be from 1% to 4% by weight of the fibers. The tanning agent on the fibers is effective to precipitate and combine with the collagen derivative brought in contact with the fibers.

A further procedure involves adding a solution of a chrome tanning agent to a slurry of collagen fibers and collagen derivative solution and thoroughly mixing. In such mixture there may be used, based on the combined weight of the fibers and collagen derivative, at least 0.2% by wieght, and where tanning is desired from 1% to 4%, preferably 2%, by weight of chromium tanning agent, calculated as $Cr_2O_3$. A masking agent such as sodium formate may be used in the ratio of from 1 to 4 parts by weight to one part by weight of the tanning agent.

When chrome tanning agent is added to the mixture of fibers and gelatin or collagen solution before sheet forming, it is important to insure that the reaction proceed slowly. Speed of reaction can be reduced by low pH values, by low temperatures and by the presence of masking agents and other salts. It has been found important to control the temperature of the mixture to which the chrome tanning agent solution is added. Too high temperature causes excessive rate of reaction of the tanning agent with the collagen derivative and fiber and produces a phenomenon best described as ropiness presumably due to case hardening or fiber dehydration which makes sheet formation difficult. Too low temperature causes separation of fluid from the mix and again presents difficulties in sheet formation. It has been found that these difficulties are avoided where the mixture of fibers and collagen derivative solution is cooled to a temperature in the range of from about 20° C. to about 35° C. before admixture of the solution of chrome tanning agent.

The sheet material comprising collagen fibers and the gelled and/or precipitated, preferably tanned, gelatin or collagen from solution is then cooled to cause the water content to freeze at a relatively slow rate with development of relatively large ice crystals. In general, this freezing will be accomplished over a period of at least about one-half hour and preferably a period of two hours or more. The sheet material may then be warmed to room temperature. If allowed to stand on a screen after warming, it will be found that a portion of the water content oozes to the surface and may drip off. A substantial proportion of the water content of the sheet, which may be from 40% to about 70% by weight, based on the weight of the water in said sheet, may be removed in liquid form by pressing of the sheet between porous surfaces.

Completion of drying of the sheet material may be effected by evaporative and/or solvent dewatering, and it is found that both evaporative and the solvent dewatering proceed at a much higher rate than is possible with sheet materials which have not been given the special freezing treatment due to the greater openness of the sheet structure and also to the partial breaking down of the gel structure.

After drying, the sheet material is usually treated to "plasticize" it, that is treated with an agent which will aid in retaining softness. Suitable plasticizers include, for example, hydrophobic oily or fatty materials such as oleic acid which may be introduced, in emulsion or solution form for example, in a methanol solution. Other "plasticizing" agents may be synthetic resinous or rubbery components which penetrate the mass and retard or prevent further water bonding. Agents falling in this latter class are natural rubber latex, butadiene acrylonitrile copolymer synthetic rubber latices in which the copolymer may comprise from about 20 to about 45% acrylonitrile, polyvinyl chloride and polyvinyl chlorideacetate latices, and in general natural and synthetic resin and rubber latices.

Sheet materials, after plasticizing, may be dried, if necessary to remove the vehicle in which the plasticizing agent, was introduced and then subjected to a needling operation comparable to that described in greater detail in the copending application of Shu-Tung Tu and John H. Highberger, Serial No. 805,032, filed April 8, 1959, entitled "Collagen Fiber Sheet Material and Method of Making."

After the needling operation, the sheet material may be coated with a plastic deposit such as formed by spraying or brushing a fluid hardenable polymer material on the surface of the sheet into which the needles have penetrated and allowing the polymer material to harden. Further finishing operations of conventional nature, such as used in the finishing of leather, may also be used, for example, plating, pressing, embossing, and the like.

The following examples are given to aid in understanding the invention, and it is to be understood that the invention is not restricted to the particular materials, proportions or procedures set forth therein:

*Example 1.*—34 lbs. of pickled cowhide splits were agitated intermittently in a small tanning drum for 20 hours with a solution comprising 1400 mls. of acetic acid, 1000 grams of sodium hydrixide and 1500 mls. of 37% formaldehyde solution all dissolved in 80 lbs. of water.

The splits were then drained and washed and passed through a chopper which cut the material into approximately 1 inch pieces. The chopped material was then introduced into a paper beater with additional water, bringing the beater load to 200 lbs. The beater was operated for about one-half hour to form a fibrous slurry, the slurry was discharged onto screens and drained. The drained material was passed through rubber squeeze rollers to bring its solids concentration to about 26.7% solids.

11.6 lbs. of the squeezed material was suspended in about 70 lbs. of water in the paper beater and the beater operated to form a slurry of separated hide fibers. 31 mls. of formic acid was added in portions to reduce the pH of the bath to pH 3.35. The resulting smooth slurry had a solids content of about 4%.

4300 mls. of a solution containing 1% of chromium calculated as $Cr_2O_3$ and also containing 0.5% of sodium formate, and having a pH of 3.0 was added to the slurry and thoroughly mixed in. The mixture was allowed to stand over night and in the morning had a pH of about 3.5.

A layer of filter paper was spread on the screen of a filter apparatus and 1700 mls. of the slurry of the collagen fibers was spread on the filter paper. 20 lbs. air pressure was applied to the surface of the slurry and caused the water component to be expressed from the fibers. Dewatering of the slurry to form a layer of intermeshed fibers was completed in about one minute.

Air pressure was released and 250 cc. of an aqueous solution containing 1% gelatin by weight at a temperature of 45° C. was spreaded on the layer of fibers. Air pressure was applied to force the gelatin solution into the layer of fibers, displacing residual water in the layer.

The resulting sheet was chilled to set the gelatin and stripped from the filter paper layer. The sheet was then frozen by placing in a "Dry Ice" chest. Freezing of the sheet was complete in about two hours.

After the sheet was frozen it was removed from the chest, warmed to room temperature and pressed between sheets of blotting paper. The pressing removed about one-half of the water content of the sheet. The sheet was then immersed in an acetone solution containing 4% oleic acid.

The sheet was left in the solution for about five minutes, then removed and allowed to dry. In the course of evaporation of the acetone, an opaque network was observed to develop in the sheet. When dry, the sheet had a porosity and feel resembling leather and had a surface resembling the natural grain layer of leather.

*Example 2.*—Pickled split cowhide trimmings were washed and brought to a pH of 8.5 by addition of sodium hydroxide. The trimmings were cut to approximately 1" pieces and 50 lbs. of the trimmings were placed in a Hollander type paper beater with 150 lbs. of water to give a solids content of about 5%. The beater was operated for one-half hour, at the end of which time the pH was readjusted to about pH 5 and 300 cc. of 37% formaldehyde solution were added. The beating was continued for five minutes and the resulting slurry was allowed to stand for two hours, then discharged onto screens and drained overnight. The drained material was passed through rubber squeeze rolls to bring its solids concentration to about 25%. The squeezed material was put back in the beater and water added to bring the solids content in the beater to about 5%. The beater was operated for one hour with the beater blades set close to the bed plate (0.003" to 0.005" clearance) to form a slurry of separated hide fibers.

One thousand grams of the slurry were mixed with two liters of water to form a uniform dispersion of the fibers in the aqueous phase.

A layer of filter paper was spread on a screen and the slurry of the collagen fibers was introduced on the filter paper layer. 20 lbs. air pressure was applied to the surface of the slurry to cause the water component to be expressed from the fibers. Dewatering of the slurry to form a layer of intermeshed fibers was completed in about one minute.

Air pressure was released and 300 cc. of an 0.85% solids solution of type A gelatin in water at a temperature of 45° C. was supplied to the surface of the fiber layer. Air pressure was again applied to force the gelatin solution into the layer of fibers, displacing residual water in the layer.

Air pressure was released, and the filter paper layer with the deposited sheet of collagen fibers with gelatin was removed from the screen and the gelatin allowed to gel. The paper layer was stripped from the set sheet; and the sheet was immersed in a 40% basic chrome tanning solution at pH 4 for one hour. The chrome tanning solution comprises 1% chromium calculated as $Cr_2O_3$ and 2% of sodium formate. The sheet was removed from the tanning solution, allowed to stand overnight, and was then washed in water.

The washed sheet was placed in a Dry Ice chest where freezing of the sheet was completed in about two hours. After the sheet was frozen, it was removed from the chest, warmed to room temperature and pressed between sheets of blotting paper. The pressing removed a substantial portion of the water content of the sheet. The sheet was then immersed in an isopropyl alcohol solution containing 4% by weight oleic acid and 4% by weight glycerin.

The sheet was removed from the isopropyl alcohol bath and while still damp was passed beneath a reciprocating bar carrying needles on its lower surface and the sheet was manipulated beneath the reciprocating needle bar to provide an average of about 1500 perforations in the sheet per square inch. The needles in the reciprocating bar were smooth needles comparable to those formerly used as phonograph needles, and the diameter of the holes in the sheet was found to be from about 0.1 to about 0.2 mm. when examined under a microscope. After the needling had been completed, the sheet was brushed with a 20% solids aqueous emulsion of a butadiene acrylonitrile copolymer synthetic rubber. Thereafter, the sheet was brushed with two coats of a conventional acrylic leather finish (Rohm & Haas No. 2) and was embossed after each coating using a temperature of 160° F. and a pressure of 75 tons for 15 seconds. A tough leather-like sheet of good appearance and feel was obtained.

*Example 3.*—A slurry of collagen fibers was formed by the procedure described in Example 2. The slurry was then removed from the beater, drained overnight, and squeezed through rubber rollers to give a fibrous mass of about 28.2% solids having a combined formaldehyde content of 0.43% by weight.

A type A gelatin (Atlantic) with a bloom rating of 275 was dissolved in water at 45° C. to give a 10% solids solution.

1,000 grams of the 28.2% solids fibrous mass was added in 50 gram portions to 310 grams of the gelatin solution and 500 cc. of water in a jacketed worm-type mixer at a temperature of 45° C. After a short mixing there were also added 100 ml. of a sodium chloride solution containing 31 grams of sodium chloride. The mixer was cooled to 20° C. and 65 cc. of a chrome tanning solution containing 6 grams of chromium calculated as $Cr_2O_3$ and 12 grams of sodium formate were added gradually. 1,093 cc. of water were added to bring the combined fiber and gelatin solids concentration to approximately 10% and the mixer was operated to effect a thorough combination of the materials. The pH of the mixture was pH 4.65. After the components were thoroughly mixed, the mixture was subjected to vacuum to reduce the amount of entrapped air and other gases. The mixture was placed on a polyethylene sheet, covered with a sheet of polyethylene terephthalate and spread by rolling and working to a thickness of about 0.1.

The resulting sheet was chilled to set the gelatin and the polyethylene and polyethylene terephthalate sheets were stripped from the solidified sheet of the mixture. The sheet was then frozen by placing in a Dry Ice chest, freezing of the sheet being completed in about one and one-half hours.

After the sheet was frozen, it was removed from the chest, warmed to room temperature and pressed between sheets of blotting paper to remove water.

The sheet was then immersed in an isopropyl alcohol solution containing 4% by weight oleic acid and 4% by weight glycerin.

The sheet was removed from the isopropyl alcohol bath and while still damp was passed beneath a reciprocating bar carrying needles on its lower surface and the sheet was manipulated beneath the reciprocating needle bar to provide an average of about 1500 perforations in the sheet per square inch. The needles in the reciprocating bar were smooth needles comparable to those formerly used as phonograph needles, and the diameter of the holes in the sheet was found to be from about 0.1 to about 0.2 mm. when examined under a microscope. After the needling had been completed, the sheet was brushed with a 20% solids emulsion of a butadiene acrylonitrile copolymer synthetic rubber. Thereafter, the sheet was brushed with two coats of a conventional acrylic leather finish (Rohm & Haas No. 2) and was embossed after each coating using a temperature of 160° F. and a pressure of 75 tons for 15 seconds.

An open fibered leather-like sheet was obtained.

*Example 4.*—43 lbs. of salt calfskin scraps were unhaired, washed and added to 120 lb. of water containing 54 cc. of a commercial $H_3PO_4$ and 138 cc. of acetic acid. After stirring the hide scraps in, the pH was 3.1. The bath was allowed to stand six days with occasional stirring. At the end of this time the scrap material was well swollen and the pH was 4.0. The scraps were washed with cold water, drained, and run several times through a mill comprising closely spaced, relatively moving rough plates, i.e., a Bauer mill. The milled product weighed about 100 lb. To this were added 20 lb. of water containing 42 cc. of mixed acid (138 cc. of acetic acid and 54 cc. of phosphoric acid). After stirring and standing briefly, the pH of the mix was 3.8. The mix was then sent through the Bauer mill again and 40 additional lbs. of water and 100 cc. of the same acid mixture were added and stirred in. After standing overnight, the pH of the mix was 3.7. To this mix there were added 20 lbs. of water and 92 cc. of the same acid mixture and the mix was then sent through the Bauer mill using close set, fine plates and came out as a smooth pasty mass at pH 3.7. In this mass a high proportion of the collagen initially present was in solution. The mass was diluted with water to a solids content of 3%.

Pickled split cowhide trimmings were washed and brought to a pH of 8.5 by addition of sodium hydroxide. The trimmings were cut to approximately 1 in. pieces and 50 lbs. of the trimmings were placed in a Hollander type paper beater with 150 lbs. of water to give a solids content of about 5%. The beater was operated for ½ hr. at the end of which time the pH was readjusted to 8.5 and 300 cc. of 37% formaldehyde were added. The beating was continued for 5 minutes and the resultant slurry was allowed to stand for 2 hrs., then discharged onto screens and drained overnight. The drained material was passed through rubber squeeze rolls to bring its solids concentration to about 25%. The squeezed material was then put back in the beater and water added to bring the solids content in the beater to about 5%. The beater was operated for one hour with the beater knife close to the plate (0.003″ to 0.005″ clearance). The slurry was then removed from the beater and acidified with sulfuric acid to bring its pH to 4. This slurry was then drained overnight and squeezed through rubber rollers to give a fibrous mass of about 26% solids.

A chromium solution of the following composition was prepared.

| | Parts by weight |
|---|---|
| Chromic sulphate, $Cr_2(SO_4)_3 \cdot XH_2O$ | 10 |
| Water | 160 |
| Sodium formate | 5 |

The chromium solution was made by dissolving the chromic sulphate in the water and adding the sodium formate to the solution. The pH of this solution was adjusted to pH 4 by addition of sodium hydroxide. The resulting solution was allowed to stand for two days to stabilize with addition of further sodium hydroxide to maintain the pH at about 4. Analysis of the resultant chrome solution showed a chromic oxide content of 1.3% and a sodium formate concentration of 2%.

1,000 grams of 26% solids fibrous mass was added to 800 grams of the 3% solids material from the Bauer mill in a jacketed, worm-type mixer at a temperature of about 10° C. After mixing, 460 grams of the chromium solution was added and well mixed in to form a doughy, pasty mass having a pH of about 4. After the components were thoroughly mixed, the mixture was subjected to a vacuum to reduce the amount of entrapped air and other gases. The mixture was placed on a polyethylene sheet, covered with a sheet of polyethylene terephthalate resin and spread by rolling and working to a layer having a thickness of about 0.1 in. After forming the layer, it was allowed to stand at room temperature overnight.

The polyethylene and polyethylene terephthalate sheets were stripped from the layer of the mixture which had solidified to a skin-like condition. The sheet was then frozen by placing in a Dry Ice chest, freezing of the sheet being completed in about two hours.

After the sheet was frozen, it was removed from the chest, warmed to room temperature and pressed between sheets of blotting paper to remove water.

The sheet was then immersed in an isopropyl alcohol solution containing 4% by weight oleic acid. The sheet was then withdrawn from the solution and allowed to dry. The dried sheet resembled leather and on testing had a shrink temperature of about 100° C.

The sheet was then passed between a reciprocating bar carrying needles on its lower surface and the sheet manipulated beneath the needle bar to provide an average of 1500 perforations in the sheet per square inch. The diameter of the holes was from about 0.1 to about 0.2 mm.

After the needling treatment a 20% solids solution of a butadiene acrylonitrile copolymer synthetic rubber latex was spread on the surface of the sheet. The latex contained 5% of a wetting agent (Triton X-200) and was spread on in amount to provide 5% solids based on the weight of the dried sheet. The sheet was dried and thereafter conventional acrylic resin emulsion finish was spread on the surface of the sheet and allowed to dry.

Thereafter the sheet was finished by conventional procedure including application of a commercial base coat containing pigment, wax and resin. The sheet was embossed by the usual commercial embossing procedure and finally a coat of an aqueous dispersion of lacquer was applied as a top coat and the sheet was plated. The resulting product resembled a good grade of natural leather.

Having thus described my invention, what I claim as new and desire to secure by Letters Patent of the United States is:

1. In a process for making an open fibered leather-like sheet material including forming a sheet comprising an intimate mixture of collagen fibers and an aqueous solution of a water-soluble skin proteinous material precipitable by a chrome tanning agent and tanning said sheet, the improvement comprising the steps of gelling the solution of proteinous material, cooling the material to a temperature below 0° C. at a slow rate to freeze the water content of said gel and develop relatively large ice crystals to rupture the gel structure thereafter warming said sheet to melt said ice crystals and removing water in liquid state from said ruptured gel.

2. In a process for making an open fibered leather-like sheet material including forming a sheet comprising an intimate mixture of collagen fibers and an aqueous solution of gelatin and tanning said sheet, the improvement comprising the steps of gelling the solution of gelatin, cooling the mixture to a temperature below 0° C. at a slow rate to freeze the water content of said gel and develop relatively large ice crystals to rupture the gel structure, thereafter warming said sheet to melt said ice crystals and removing water in liquid state from said ruptured gel.

3. In a process for making an open fibered leather-like sheet material including forming a sheet comprising a mixture of collagen fibers, and an aqueous solution of gelatin and tanning said sheet, the improvement comprising the steps of including chromium tanning agent in said mixture gelling the solution of gelatin, cooling the mixture to a temperature below 0° C. at a slow rate to freeze the water content of said gel and develop relatively large ice crystals to rupture the gel structure, thereafter warming said sheet to melt said ice crystals and removing water in liquid state from said ruptured gel, said aqueous solution of gelatin in said mixture containing from about 0.5% to about 10% by weight gelatin solids and being at a temperature of from about 35° C. to about 50° C., said mixture containing gelatin solution in amount to provide from about 2% to about 20% by weight of gelatin solids based on the combined weight of collagen fibers and gelatin solids, and said chromium tanning agent being present in said mixture in amount to provide a chromium content of at least 0.2% by weight calculated as $Cr_2O_3$ based on the weight of the gelatin and fibers.

4. A process for making an open fibered leather-like sheet material as defined in claim 3 in which the gelatin solids in said mixture constitute from 10% to 12% by weight based on the combined weight of collagen fibers and gelatin solids, the content of collagen fibers and gelatin solids in said mixture constitute from about 5% to about 25% of the weight of the mixture at the time of cooling to form ice crystals and the rate of cooling is controlled so that at least about ½ hour of cooling is required to form ice crystals.

References Cited in the file of this patent
UNITED STATES PATENTS

| 2,703,782 | Regan | Mar. 8, 1955 |
| 2,934,446 | Highberger | Apr. 26, 1960 |
| 2,934,447 | Highberger | Apr. 26, 1960 |

UNITED STATES PATENT OFFICE
CERTIFICATE OF CORRECTION

Patent No. 3,136,682  
June 9, 1964

Shu-Tung Tu

It is hereby certified that error appears in the above numbered patent requiring correction and that the said Letters Patent should read as corrected below.

Column 1, line 38, before "and" insert -- into the material and passage of the solvent --; column 2, line 57, for "materials" read -- material --; column 4, line 62, for "wieght" read -- weight --; column 6, line 20, for "had" read -- has --.

Signed and sealed this 10th day of November 1964.

(SEAL)  
Attest:

ERNEST W. SWIDER  
Attesting Officer

EDWARD J. BRENNER  
Commissioner of Patents